April 27, 1965  H. BÖHME ETAL  3,180,240
PHOTOGRAPHIC CAMERA WITH BUILT-IN FLASHBULB UNIT
Filed May 23, 1962

INVENTORS
Hermann Böhme
Georg Lohse
BY
ATTORNEYS

United States Patent Office 3,180,240
Patented Apr. 27, 1965

3,180,240
PHOTOGRAPHIC CAMERA WITH BUILT-IN FLASHBULB UNIT
Hermann Böhme, Leopoldstr. 23, Braunschweig, Germany, and Georg Lohse, Braunschweig, Germany; said Lohse assignor to said Böhme
Filed May 23, 1962, Ser. No. 197,138
Claims priority, application Germany, May 25, 1961, B 62,629
2 Claims. (Cl. 95—11.5)

This invention relates to photographic cameras with built-in flashbulb units, and, more particularly, to an improved built-in flashbulb unit, including a reflector, and designed for use with the type of flashbulb having a relatively elongated envelope whose longer axis is coaxial with the axis of the bulb receiving opening or cutout of the reflector.

In the copending application Serial No. 139,967, filed September 22, 1961, now Patent No. 3,109,595, there is shown and described a flashbulb unit which, while not built into the camera, has novel retaining means whereby a flashbulb of such type is positioned in the reflector in such positional relation that the transverse plane of the bulb-receiving opening of the reflector intersects the longer axis of the bulb either between the electrode support of the flashbulb and the electrode tips thereof, or at the electrode support. Furthermore, the arrangement is such that the envelope of the flashbulb projects partially outwardly from the reflector, in addition to which the outer or maximum diameter of the reflector is substantially twice the lateral diameter of the flashbulb.

A flashbulb device of the type shown and described in my said copending application is equivalent, in terms of its luminous efficiency, to conventional types of flashbulb devices of very appreciably larger dimensions. Owing to its very small dimensions, considered from the standpoint of the luminous efficiency, such a flashbulb device is eminently suitable as a unit to be built-in into photographic cameras.

An object of the present invention is to provide improved structural arrangements for the reflector of such a flashbulb unit, these constructional arrangements being of such a nature that they can be accommodated within the overall dimensions of conventional cameras without any undue increase in such dimensions.

More particularly, in accordance with the present invention, the flashbulb unit, and particularly the reflector, is so designed that it may be formed as part of a wall of the camera hood or flush mounted in a wall thereof. The outer surfaces of the hood wall around the reflector are designed as plane surfaces. Furthermore, the retaining device, or socket, for the flashbulb is so mounted, with respect to the reflector, that the plane of the reflector opening for receiving the flashbulb intersects the longer axis of the flashbulb either substantially at the position of the electrode support or between the electrode support and the tips of the electrode, with the bulb envelope projecting partly outside of the reflector.

For an understanding of the principles of the invention, reference is made to the following description of typical embodiments thereof as illustrated in the accompanying drawings. In the drawings.

Figure 1:
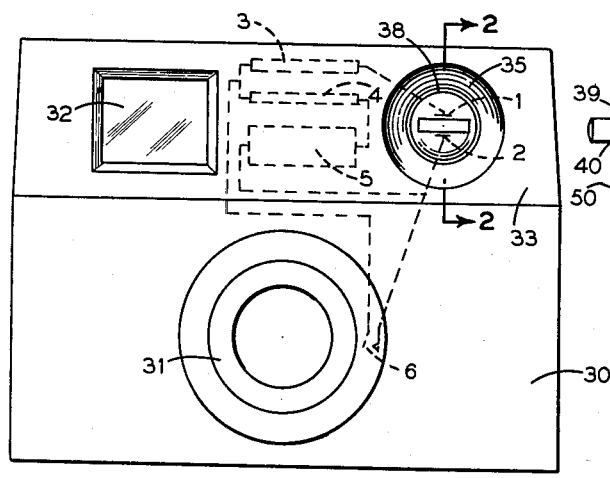
FIG. 1 is a front elevational view of a photographic camera including a built-in flashbulb unit embodying the present invention.
Figure 2:
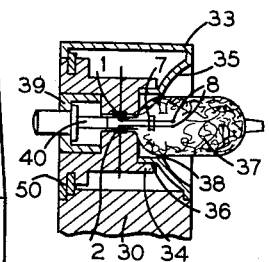
FIG. 2 is a sectional view of the camera, taken along the line 2—2 of FIG. 1.

In each of the embodiments illustrated in the drawing, the invention is illustrated as incorporated in a hood of a photographic camera having a housing 30 and an objective lens mounting 31. In the embodiment of FIGS. 1 and 2, the finder viewing aperture is indicated at 32 and, in the embodiments illustrated in FIGS. 3 and 5, the finder viewing aperture is indicated at 32' and 32", respectively.

Referring to FIG. 1, the electrical circuit for triggering the flashbulb is somewhat schematically illustrated as including electrical contacts 1 and 2 which are incorporated in the socket or mounting for the flashbulb and engage suitable mating contacts on the base of the flashbulb 37. The electrical circuitry for triggering the flashbulb further includes conductors connecting the contacts 1 and 2 to a capacitor 3, a resistor 4, and a battery 5. A switch is indicated at 6 as operable coincidentally with the triggering of the shutter. This switch is shown as normally open, but is closed to trigger or fire the flashbulb as the shutter is triggered to make an exposure. The electrical arrangements schematically illustrated in FIG. 1 are similarly incorporated in the embodiments of the invention illustrated in FIGS. 3 through 6.

By reference to FIG. 2, it will be noted that the diametric or lateral plane of the opening 38 in reflector 35, through which the flashbulb 37 is inserted into its socket 34, intersects the longer axis of the flashbulb 37 at a point between the support 7 for the bulb electrodes and the electrode tips 8, and that furthermore, the envelope of the flashbulb 37 projects partially outwardly of the reflector 35.

In the embodiment of the invention shown in FIGS. 1 and 2, the camera housing 30 has associated therewith a top hood 33. Reflector 35, in this embodiment of the invention, is hemispherical in shape and is formed as an integral part of the front wall of the hood 33. Reflector 35 is formed with a cylindrical shoulder or projection 36 projecting inwardly of the hood around opening 38, and which serves as a seating and centering device for lamp socket 34 which is inserted into hood 33 from the rear of the hood.

The reflector 35 and the lamp socket 34 are so interrelated as to provide the relative relation between the flashbulb 37 and the lateral plane of the flashbulb receiving opening 38 of the reflector 35 as described above. Reflector opening 38 is so dimensioned that it will closely embrace the flashbulb 37 while still permitting an unhindered insertion or ejection of the flashbulb 37 relative to the socket 34. For ejecting the flashbulb, an ejector 40 is slidably mounted in a sleeve 39 secured to the socket and has an operating end projecting outwardly of the rear wall of hood 33. An opening 50 is provided in the rear wall of the hood 33, and is made sufficient in size to allow the insertion of tools necessary for proper shaping of the reflector 35, and the socket 34 is inserted through this opening 50 and suitably anchored in position in the hood 33.

Figure 3:
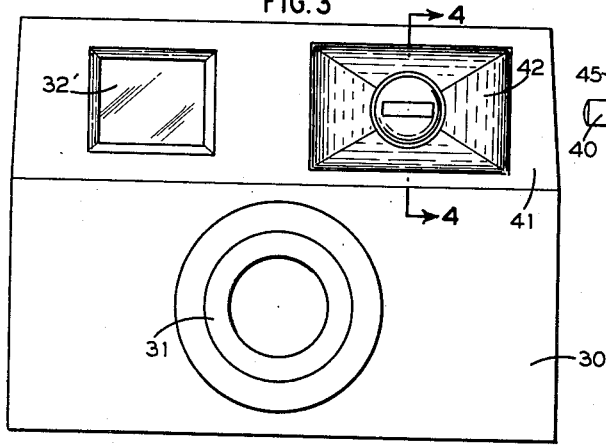
FIG. 3 is a front elevational view of a photographic camera illustrating another embodiment of the built-in flashbulb unit of the invention.
Figure 4:
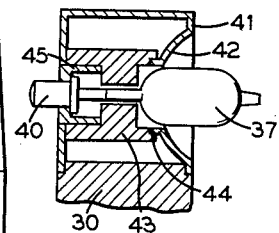
FIG. 4 is a sectional view taken along the line 4—4 of FIG. 3.

In the embodiment of the invention shown in FIGS. 3 and 4, a reflector 42, which is rectangular in front elevation, is formed integrally with the camera hood 41. By taking advantage of the elastic or flexible properties of the hood material, the lamp socket 43 may be inserted into the hood 41 from underneath and held in position by being snapped over a cylindrical shoulder 44 on the integral reflector 42, the lamp socket 43 being further properly centered by means of a centering piece 45 inserted through a corresponding sized opening in the rear wall of the hood 41. The lamp bulb ejector 40 is slidably mounted in the centering member 45. To simplify the illustration in FIGS. 3 and 4, the electrical connections to the flashbulb 37 have been omitted.

To enhance their reflecting properties, the reflectors 35 of FIGS. 1 and 2, and 42 of FIGS. 3 and 4, respectively, may be provided, on their outer or reflecting surfaces, with vapor-deposited highly reflective coatings.

Figure 5:
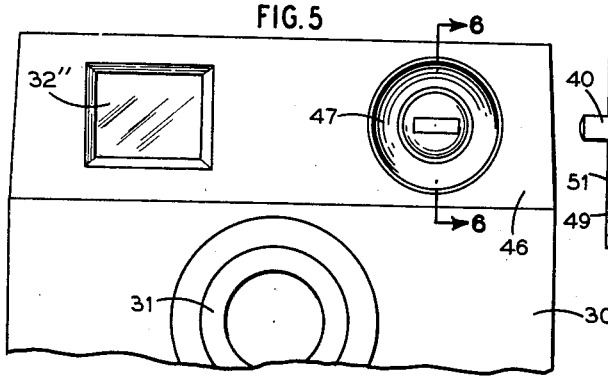
FIG. 5 is a front elevational view of a photographic camera illustrating still another embodiment of the built-in flashbulb unit of the present invention.
Figure 6:
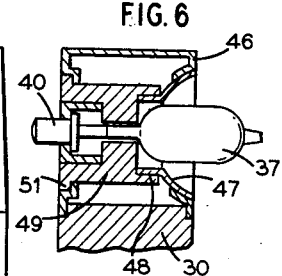
FIG. 6 is a sectional view taken on the line 6—6 of FIG. 5.

In the embodiment shown in FIGS. 5 and 6, the camera hood 46 is so formed that it is provided with a contoured annular recess in its front wall capable of seating a substantially hemispherical reflector 47 in such a manner that the lateral plane of the outer end of a reflector 47 is flush with the outer surface of the front wall of the hood 46. Reflector 47 has a cylindrical extension 48 surrounding its bulb receiving cutout and engaged in a bulb socket 49 which is flush mounted through the rear wall of the hood 46, the socket 49 having a shoulder or flange 51 engaging a corresponding shoulder formation on the inner surface of the rear wall of the hood 46, the seating relations being such that the outer end surface of the socket 49 is flush with the outer surface of the rear wall of hood 46.

The flashbulb unit can be so built in into the camera that all of its components, which are required for proper operation thereof, are mounted within the camera hood and fixed therein to form a unit. Furthermore, the built-in flashbulb unit can be so designed that it forms the entire rear wall of the camera hood such as 33, 41, or 46.

While specific embodiments of the invention have been shown and described to illustrate the application of the principles of the invention, it will be understood that the invention may be embodied otherwise without departing from such principles.

What is claimed is:
1. A photographic camera with a permanently built-in flash device comprising, in combination, a camera body including an objective mount and having a normally upper relatively narrow wall; a hood mounted on said upper wall and including spaced, substantially flat front and rear walls, said front wall having an inwardly extending reflector incorporating recess therein; said recess having its innermost portion formed with a circular opening, in a plane substantially parallel to said front and rear walls, and having a diameter slightly in excess of that of the envelope of a flashbulb of the type having a relatively elongated envelope enclosing a pair of relatively elongated electrodes extending outwardly from an electrode support, and with a cylindrical collar extending coaxially inwardly from said opening; a lamp socket having a forward end in center supporting engagement with said collar and a rear end in supporting engagement with said rear wall; and a flashbulb of said type engaged in said socket and extending outwardly through said opening; the positional relationship and dimensions of said socket and of said recess being such that the electrode support of said flashbulb lies substantially in the plane of said opening and the flashbulb envelope projects outwardly of said flat front wall.

2. A photographic camera, as claimed in claim 1, including manually operable flashbulb ejector means movably mounted in said socket and selectively engageable with the base of said flashbulb for ejection of said flashbulb from said reflector, the operating end of said ejector extending outwardly through an opening in said rear wall.

References Cited by the Examiner
UNITED STATES PATENTS

| | | |
|---|---|---|
| 2,384,327 | 9/45 | Mendelsohn. |
| 2,542,311 | 2/51 | Carlson _____ 240—1.3 |
| 2,690,503 | 9/54 | Garland _____ 240—41 X |
| 2,783,696 | 3/57 | Sewig _____ 240—1.3 X |
| 2,977,865 | 4/61 | Irwin _____ 95—11 |
| 2,984,810 | 5/61 | Kenichi Kawate _____ 339—45 |
| 3,001,461 | 9/61 | Irwin _____ 240—1.3 X |
| 3,080,804 | 3/63 | Steinback _____ 95—11.5 X |

FOREIGN PATENTS 1,136,789  1/57  France.

NORTON ANSHER, *Primary Examiner.*